United States Patent [19]

Freitas, Jr.

[11] 3,834,657
[45] Sept. 10, 1974

[54] MOUNTING AND SUPPORT DEVICE FOR A ROTARY MACHINE

[76] Inventor: Antone Freitas, Jr., 14513 Elm St., San Leandro, Calif. 94579

[22] Filed: Nov. 8, 1972

[21] Appl. No.: 304,846

[52] U.S. Cl. .......................... 248/23, 74/242.13 R
[51] Int. Cl. ...................... F16m 11/04, F16m 3/00
[58] Field of Search ....... 248/23, 19, 13; 74/242.12, 74/242.15 R, 242.14 R, 242.13 R, 242.13 A

[56] References Cited
UNITED STATES PATENTS

| | | | |
|---|---|---|---|
| 1,207,719 | 12/1916 | Diehl et al. | 248/23 X |
| 1,207,828 | 12/1916 | Zabriskie et al. | 48/23 X |
| 1,370,006 | 3/1921 | Cook | 248/23 X |
| 1,528,268 | 3/1925 | Schlegel | 248/231 X |
| 1,742,874 | 1/1930 | Prescott | 74/242.13 X |
| 2,188,827 | 1/1940 | Bradfield | 248/23 |
| 2,300,879 | 11/1942 | Eley | 248/23 X |

FOREIGN PATENTS OR APPLICATIONS

| | | | |
|---|---|---|---|
| 725,637 | 3/1955 | Great Britain | 248/23 |

Primary Examiner—J. Franklin Foss
Attorney, Agent, or Firm—Harris Zimmerman

[57] ABSTRACT

A support device for an alternator or generator includes a horizontal mounting plate which is laterally movable in relation to a driving source for the alternator or generator. The mounting plate is provided with a slot which receives and secures a bar from a generator support member or an alternator support member. The generator support member includes vertical arms in a channel-like configuration with a chain attached to the arms to secure a generator therebetween. The alternator support member includes a rod on which an alternator may be positioned by means of an aperture through the alternator. A drive belt secured between the driving source and the alternator or generator is properly tensioned by appropriate lateral movement of the mounting plate.

3 Claims, 8 Drawing Figures

3,834,657
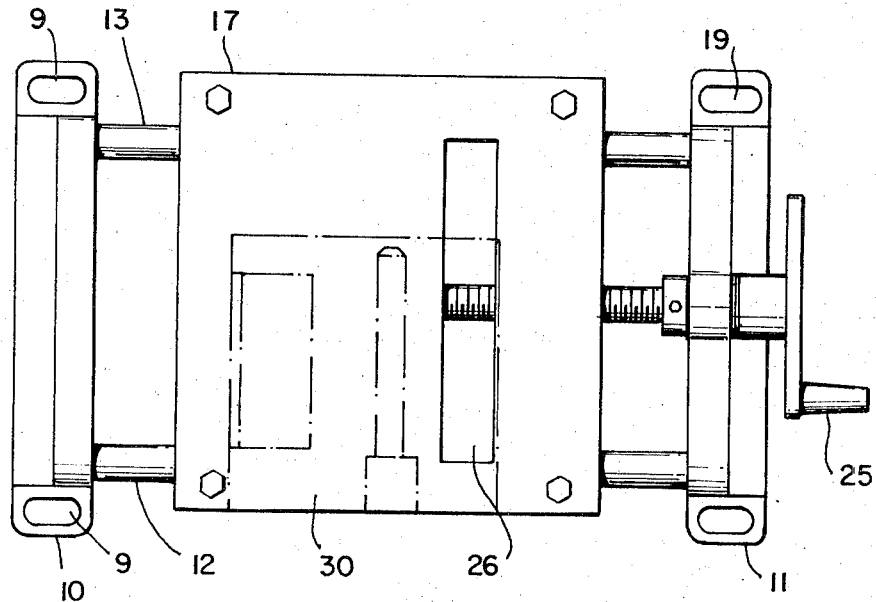
FIG_1
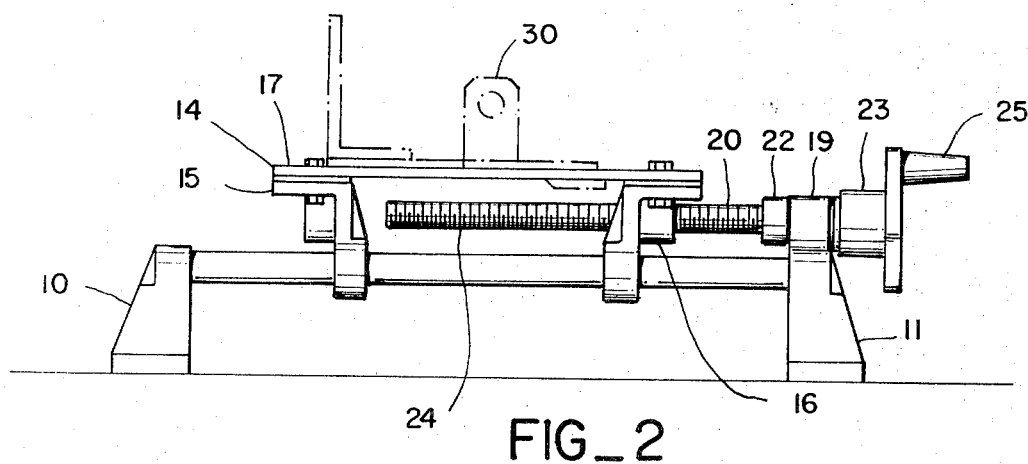
FIG_2
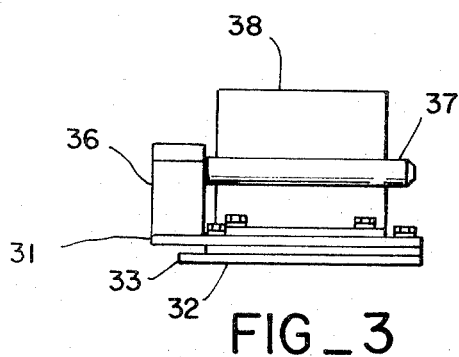
FIG_3
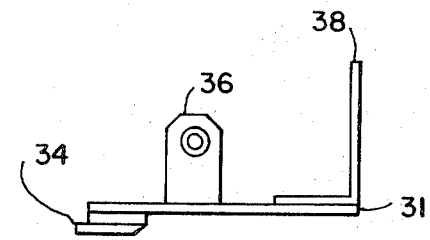
FIG_4

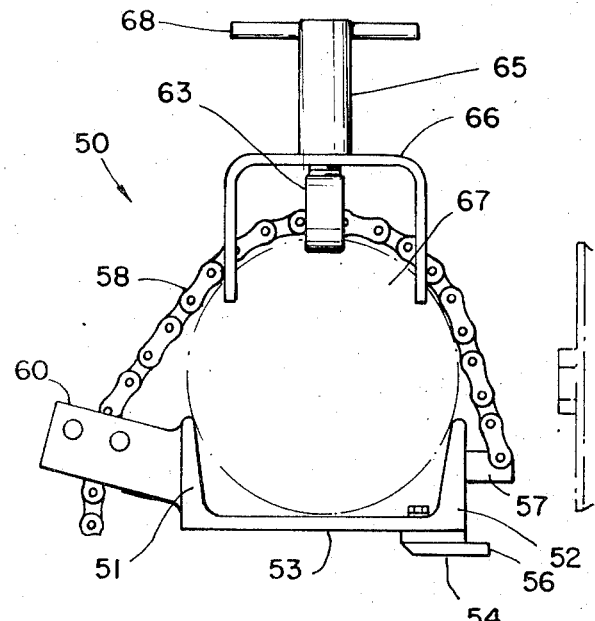
FIG_5
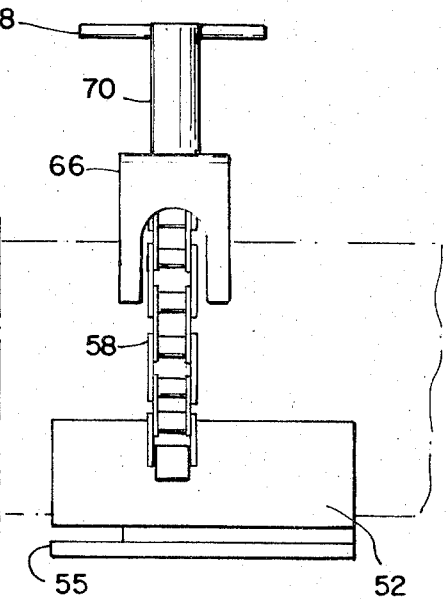
FIG_6
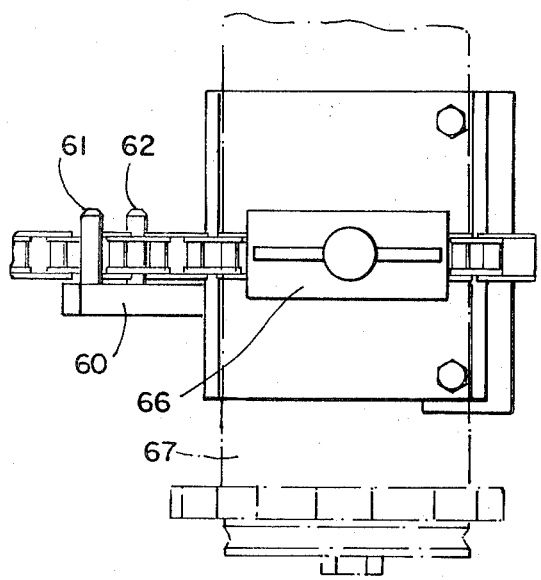
FIG_7
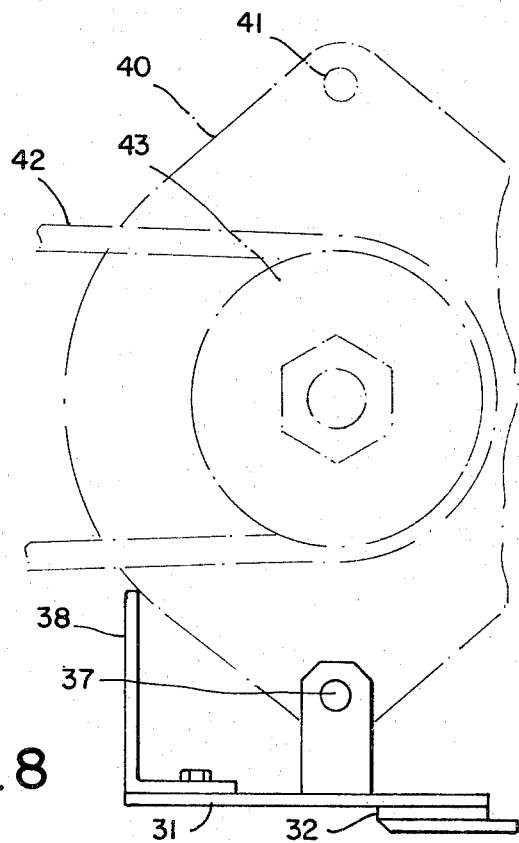
FIG_8

MOUNTING AND SUPPORT DEVICE FOR A ROTARY MACHINE

BACKGROUND OF THE INVENTION

In many operational situations, alternators or generators are hand-mounted to a mounting base by means of bolts or the like received through mounting holes in the mounting base and the alternator or generator. Typically the alternator or generator is driven by a rotary power source by means of an endless drive belt therebetween. To provide proper tensioning of the drive belt either an idler pulley or a movable mounting base may be employed. This method of mounting an alternator or generator is successful in situations in which the device remains in use for long periods of time. In some circumstances, however, it becomes necessary to remove or replace the alternator or generator frequently. In these situations the manipulation of the mounting bolts and tensioning means is laborious, time-consuming and expensive. In the manufacture, repair and rebuilding of alternators and generators, for example, it is necessary to operate the electromotive device for a short period of time to ensure quality control. No prior art device, however, is designed to facilitate this type of operation with easily removed mounting fasteners and readily adjustable tensioning means.

SUMMARY OF THE INVENTION

The present invention provides a mounting and support device for interchangeably mounting alternators or generators with a minimum of labor and effort, while facilitating the proper tensioning of the drive belt. It consists of a mounting plate which is fastened to a carriage slidably secured on horizontal rods. The carriage position is controlled by a threaded rod received in suitably threaded apertures in the carriage and a bearing aperture in an anchored base member. A slot in the mounting plate insertably receives a flanged locking member of a generator support member or an alternator support member, securing either member to the mounting plate. The generator support member has vertical arms in a channel-configuration to receive a generator therebetween. A chain fastened to both of the arms firmly secures the generator in place. The alternator support member includes a horizontal rod on which an alternator may be mounted by means of a cooperating aperture in the alternator. Tensioning of the drive belt used to rotate the alternator or generator is achieved by moving the carriage by means of the threaded rod.

THE DRAWING

FIG. 1 is a plan view of one embodiment of the present invention;

FIG. 2 is a front view of the embodiment of FIG. 1;

FIG. 3 is a side view of the alternator support member;

FIG. 4 is a rear elevational view of the member shown in FIG. 3;

FIG. 5 is a front view of the generator support member;

FIG. 6 is a side view of the member shown in FIG. 5;

FIG. 7 is a top view of the member shown in FIG. 5; and

FIG. 8 is a front view of the alternator support member.

DESCRIPTION OF THE PREFERRED EMBODIMENT

The present invention as shown in FIG. 1 and FIG. 2 includes base members 10 and 11 with apertures 9 therethrough to facilitate firmly securing the mounting and support device in any desired location. Transverse to the base members and secured therebetween are carriage rods 12 and 13 which maintain the base members in a fixed, spaced-apart relationship. A carriage 14 comprising carriage brackets 15 and 16 and mounting plate 17 is slidably received on the carriage rods by means of apertures through the carriage brackets. The mounting plate may be fastened to the carriage brackets by bolting, welding, or similar means.

Base member 11 includes a boss 19 with an aperture therethrough which receives a shaft 20. The diametrically enlarged portions 22 and 23 cooperate with the boss to prevent axial motion of the shaft. The threaded portion 24 of the shaft is received through suitably threaded and aligned holes in the carriage brackets. The handle 25 secured to the shaft permits manual rotation of the shaft, causing the carriage to translate laterally on the carriage rods in typical screw-jack fashion.

An alternator support member 30, shown in phantom in FIGS. 1 and 2, may be secured to the mounting plate by means of slot 26. As shown in FIG. 3 and FIG. 4, the alternator support member includes a plate 31 with a locking member 32 depending therefrom. The locking member is shorter and narrower than the slot 26, and has a front flange 33 and a side flange 34 extending therefrom. The locking bar is inserted into the slot and positioned so that the flanges cooperate with the edges of the slot and the underside of mounting plate 17 to effectively secure the alternator support member to the mounting plate. The alternator support member also includes a bracket 36 from which a mounting rod 37 extends horizontally. A vertical support arm 38, which may be formed of angle iron welded or bolted to plate 31, serves to stabilize a mounted alternator.

With reference to FIG. 8 and FIG. 2, the method of using the present invention to mount and support an alternator may readily be seen. An alternator 40 with symmetrical mounting holes 41 through its frame is secured to the alternator support member by positioning the rod 37 through one of the holes 41. The drive belt 42 is secured to the pulley 43 of the alternator, and the carriage with the alternator support member secured thereto is moved laterally by means of the threaded shaft 20 to provide the proper tension on the drive belt. Tensioning of the belt causes the frame of the alternator to bear against the support arm 38, providing a stable mounting free of vibration and rocking. It may be appreciated that the mounting of the alternator is accomplished with a minimum of time and labor.

In conjunction with a generator support member 50, the present invention may be employed to mount and support a generator with similar ease and convenience. The generator support member shown in FIG. 5 and FIG. 6 comprises two vertical arms 51 and 52 secured to a plate portion 53 in a channel-configuration. Protruding from the lower surface of plate 53 is a locking member 54 with a protruding front flange 55 and protruding side flange 56. The locking member 54 cooperates with the slot 26 of the mounting plate 17, in a manner similar to that described for the alternator support member, to secure the generator support member to the carriage. Protruding from vertical arm 52 is a chain anchor 57, to which one end of a chain 58 is secured. An oblique arm 60 protrudes from vertical arm 51. Two horizontal posts 61 and 62 fastened to arm 60 are spaced apart sufficiently to capture any one chain link inserted therebetween, as shown in FIG. 7. The chain also passes through the pull ring 63 of chain tensioner 65. The chain tensioner consists of a channel-like bracket 66 which bears on the casing of a generator 67, and a handle 68 which is used to rotate a screw jack within tubular member 70 to provide a vertical force to the chain pull ring.

A generator is easily and securely mounted on the present invention by securing the generator mounting member to the carriage plate, and resting the generator on the plate 53 between vertical arms 51 and 52. The chain 18 is then secured tautly around the generator and placed in the clasp of posts 61 and 62. The chain tensioner 65 is then tightened by rotating the handle 68, causing the chain to tighten and the bracket 66 to bear down firmly on the generator, securing it in place. A drive belt is then placed on the generator pulley, the carriage is moved by means of the threaded rod 20 to tension the belt, and the generator is ready for operation. It may be seen that this procedure is much quicker and far superior to the prior art forms of manipulating bolts, etc.

Although the present invention has been described with reference to its use with alternators and generators, it should be noted that the present invention may be effectively employed with other rotating machinery such as pumps, compressors, winders, electric motors, and the like.

I claim:

1. A mounting and support device for a rotary machine, comprising: base means for supporting said device; carriage means slidably secured to said base means for laterally positioning a rotary machine in relation to a rotary power source; support means removably secured to said carriage means for holding said rotary machine, said support means including a horizontal mounting plate secured to said carriage means and having a rectangular aperture therethrough extending substantially the length of said mounting plate; a horizontal support plate resting upon said mounting plate and removably secured thereto, said support plate having a locking bar subjacently depending therefrom and including horizontally extending flanges, said locking bar adapted to be received in said rectangular aperture, said flanges engaging the edges of said aperture and the underside of said mounting plate to lockingly retain said support plate on said mounting plate; and vertically extending support members secured to said support plate to support and retain a rotary machine.

2. The mounting and support device of claim 1, wherein said vertically extending support members comprise a vertical plate extending the length of said support plate, and a horizontal rod parallel to said vertical plate and said support plate and spaced apart from said vertical plate and said support plate, said horizontal rod supported at one end by a brace disposed substantially medially along one edge of said support plate.

3. The mounting and support device of claim 1 wherein said vertically extending support members comprise two vertical plates secured to opposed edges of said support plate in channel like configuration and adapted to support a rotary machine on said support plate and said vertical plates.

* * * * *